(12) United States Patent
Ivanov Bonev et al.

(10) Patent No.: US 11,120,569 B2
(45) Date of Patent: Sep. 14, 2021

(54) HEAD POSE ESTIMATION

(71) Applicant: Synaptics Incorporated, San Jose, CA (US)

(72) Inventors: Boyan Ivanov Bonev, Santa Clara, CA (US); Utkarsh Gaur, Millbrae, CA (US)

(73) Assignee: Synaptics Incorporated, San Jose, CA (US)

( * ) Notice: Subject to any disclaimer, the term of this patent is extended or adjusted under 35 U.S.C. 154(b) by 77 days.

(21) Appl. No.: 16/450,832

(22) Filed: Jun. 24, 2019

(65) Prior Publication Data

US 2020/0402253 A1 Dec. 24, 2020

(51) Int. Cl.
*G06K 9/00* (2006.01)
*A61B 3/14* (2006.01)
*G06T 7/70* (2017.01)

(52) U.S. Cl.
CPC ............ *G06T 7/70* (2017.01); *G06K 9/00255* (2013.01); *G06K 9/00281* (2013.01); *G06T 2207/20084* (2013.01); *G06T 2207/30201* (2013.01)

(58) Field of Classification Search
USPC ................ 382/100, 103, 106–108, 115–118, 382/154–155, 162, 168, 173, 181, 190, 382/199, 209, 219, 224, 254, 276, 382/286–291, 305, 312; 1/1; 345/156, 345/419; 351/209
See application file for complete search history.

(56) References Cited

U.S. PATENT DOCUMENTS

| | | | |
|---|---|---|---|
| 2012/0139832 A1* | 6/2012 | Hu ..................... | G06K 9/00268 345/156 |
| 2015/0035825 A1* | 2/2015 | Zhou ..................... | G06T 13/40 345/419 |
| 2018/0005018 A1* | 1/2018 | Young ................ | G06K 9/00228 |
| 2018/0032825 A1* | 2/2018 | Fung .......................... | G06T 7/73 |
| 2018/0225842 A1* | 8/2018 | Wang ................ | G06K 9/00281 |
| 2020/0051267 A1* | 2/2020 | Knorr ..................... | G06T 7/579 |
| 2020/0175260 A1* | 6/2020 | Cheng .................. | G06K 9/4642 |

* cited by examiner

*Primary Examiner* — Seyed H Azarian
(74) *Attorney, Agent, or Firm* — Paradice and Li LLP

(57) ABSTRACT

A method and apparatus for estimating a user's head pose relative to a sensing device. The sensing device detects a face of the user in an image. The sensing device further identifies a plurality of points in the image corresponding to respective features of the detected face. The plurality of points includes at least a first point corresponding to a location of a first facial feature. The sensing device determines a position of the face relative to the sensing device based at least in part on a distance between the first point in the image and one or more of the remaining points. For example, the sensing device may determine a pitch, yaw, distance, or location of the user's face relative to the sensing device.

16 Claims, 9 Drawing Sheets

HEAD POSE ESTIMATION

TECHNICAL FIELD

The present embodiments relate generally to devices and systems for head pose estimation.

BACKGROUND OF RELATED ART

User head pose information has many uses and applications in various systems and devices that may interact with a user by providing services, outputting and/or retrieving information, displaying and/or playing back media content, and the like. Head pose information may indicate a position of the user's head relative to a point of reference associated with the electronic system or device. For example, the point of reference may correspond to a camera or image capture device used to capture an image of the user's head and/or face, or otherwise detect a presence of the user on behalf of the electronic system or device. The head pose of the user may affect how the electronic system or device responds to user inputs from a particular user.

SUMMARY

This Summary is provided to introduce in a simplified form a selection of concepts that are further described below in the Detailed Description. This Summary is not intended to identify key features or essential features of the claims subject matter, nor is it intended to limit the scope of the claimed subject matter.

A method and apparatus for head pose estimation is disclosed. One innovative aspect of the subject matter of this disclosure can be implemented in a method of determining a head pose of a user by a sensing device. In some embodiments, the method may include steps of detecting a face in an image, identifying a plurality of points in the image corresponding to respective features of the detected face, where the plurality of points include at least a first point corresponding to a location of a first facial feature, and determining a position of the face relative to the sensing device based at least in part on a distance between the first point in the image and one or more of the remaining points.

BRIEF DESCRIPTION OF THE DRAWINGS

The present embodiments are illustrated by way of example and are not intended to be limited by the figures of the accompanying drawings.

DETAILED DESCRIPTION

Figure 1:
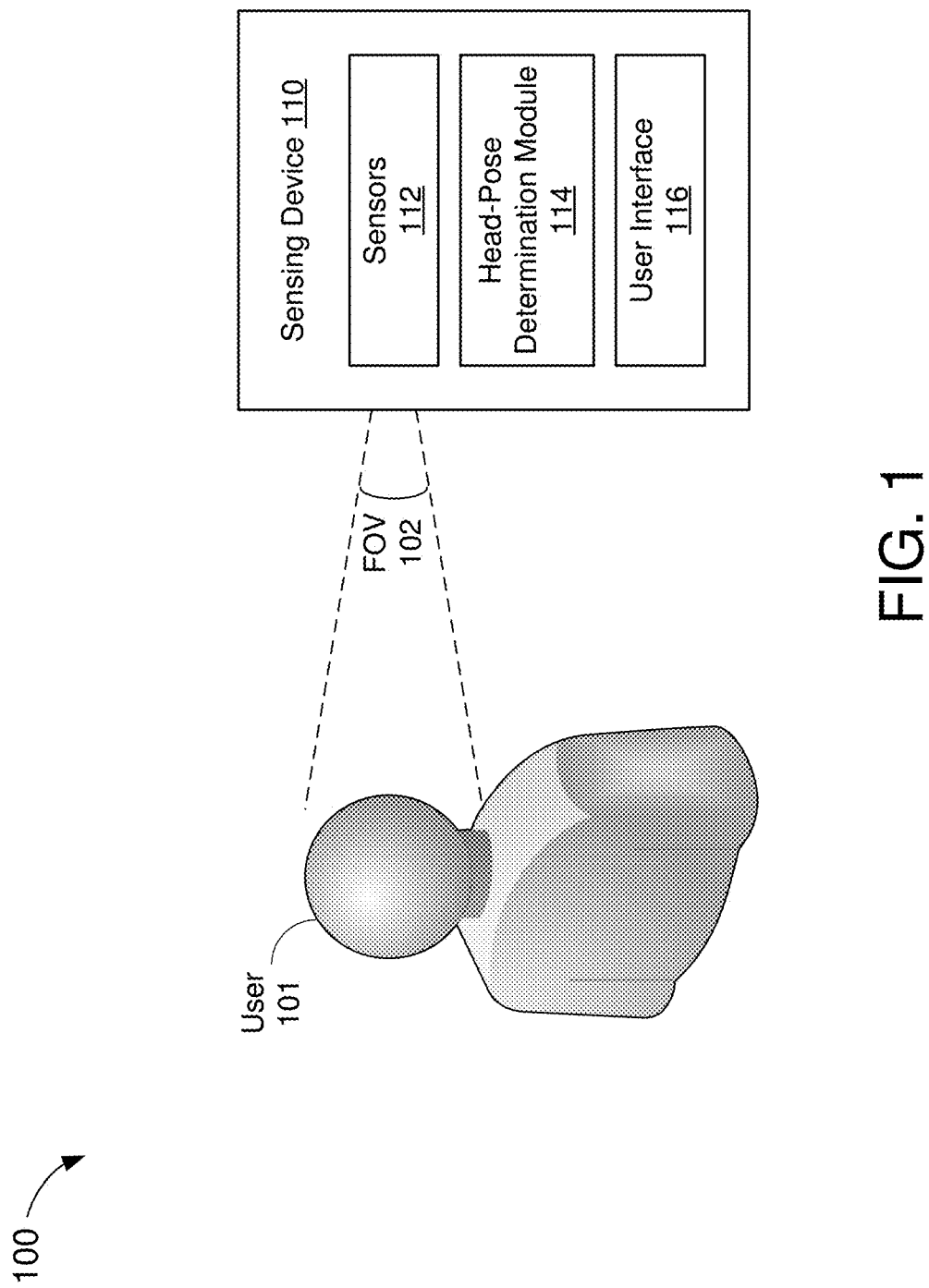
FIG. 1 shows an example environment in which the present embodiments may be implemented.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. The interconnection between circuit elements or software blocks may be shown as buses or as single signal lines. Each of the buses may alternatively be a single signal line, and each of the single signal lines may alternatively be buses, and a single line or bus may represent any one or more of myriad physical or logical mechanisms for communication between components.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described above. The non-transitory computer-readable storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein, may refer to any general-purpose processor, conventional processor, controller, microcontroller, and/or state machine capable of executing scripts or instructions of one or more software programs stored in memory. The term "sensing device," as used herein, may refer to any device capable of detecting a user of the device and/or sensing user inputs. Examples of sensing devices may include, but are not limited to, smart speakers, home automation devices, voice command devices, virtual assistants, personal computing devices (e.g., desktop computers, laptop computers, tablets, web browsers, and personal digital assistants (PDAs)), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), media devices (e.g., recorders, editors, and players such as televisions, set-top boxes, music players, digital photo frames, and digital cameras), and the like.

FIG. 1 shows an example environment 100 in which the present embodiments may be implemented. The environment 100 includes a user 101 and a sensing device 110. The sensing device 110 may detect a presence of one or more users (such as user 101) within its field-of-view (FOV) 102 and may determine a pose or position of each user's head relative to the sensing device 110. In some implementations, the sensing device 110 may also detect and respond to user inputs by the user 101 based, at least in part, on the user's head pose.

The sensing device 110 includes one or more sensors 112, a head-pose determination module 114, and a user interface 116. The sensor 112 may be configured to receive user inputs and/or collect data (e.g., images, video, audio recordings, and the like) about the surrounding environment. Example suitable sensors include, but are not limited to, cameras, capacitive sensors, microphones, and the like. In some aspects, one or more of the sensors 112 (e.g., a camera) may be configured to capture images and/or video of the user 101. For example, the camera may be configured to capture images (e.g., still-frame images and/or video) of a scene, including any objects within the FOV 102 of the sensing device 110.

The head-pose determination module 114 may process the images captured by the sensors 112 to determine a head pose of the user 101. In some embodiments, the head-pose determination module 114 may estimate the user's head pose based, at least in part, on facial landmark information extracted from the images. The facial landmark information may indicate respective locations (e.g., pixel locations or coordinates) of one or more facial features including, but not limited to, the eyes, mouth, and/or nose. Such facial landmark information may be extracted from any images containing a near-frontal view of a user's face (e.g., where at least the nose can be seen). In some aspects, the head-pose determination module 114 may implement one or more neural network models to infer the presence and locations of the facial features in a captured image. The neural network models may be trained to recognize human faces, including characteristic features of each face (e.g., eyes, mouth, nose, etc.), through deep learning.

Deep learning is a particular form of machine learning in which the training phase is performed over multiple layers, generating a more abstract set of rules in each successive layer. Deep learning architectures are often referred to as artificial neural networks due to the way in which information is processed (e.g., similar to a biological nervous system). For example, each layer of the deep learning architecture may be composed of a number of artificial neurons. The neurons may be interconnected across the various layers so that input data (e.g., the raw data) may be passed from one layer to another. More specifically, each layer of neurons may perform a different type of transformation on the input data that will ultimately result in a desired output (e.g., the answer). The interconnected framework of neurons may be referred to as a neural network model. Thus, the neural network models may include a set of rules that can be used to describe a particular object or feature such as, for example, a human face.

In some embodiments, the head-pose determination module 114 may determine the pose or position of the user's head based on relative distances between the detected facial features. As the pitch of the user's head increases (e.g., tilts towards the sky), the upper portion of the face becomes compressed while the lower portion of the face becomes more pronounced in a two-dimensional (2D) image. For example, when the user's head is titled back, the pixel distance from the nose to the mouth may be greater than the pixel distance from the nose to the eyes. It is also noted that, as the yaw of the user's head increases (e.g., turns towards the right), the right side of the face becomes compressed while the left side of the face becomes more pronounced in a 2D image. For example, when the user's head is turned to the right, the pixel distance from the nose to one or more features on the left half of the face may be greater than the pixel distance from the nose to similar features (e.g., due to facial symmetry) on the right half of the face. Aspects of the present disclosure recognize that the nose may be used as a point of reference for determining the user's head pose.

The user interface 116 may provide an interface through which the user 101 can operate, interact with, or otherwise use the sensing device 110 or an electronic system (not shown for simplicity) coupled to the sensing device 110. For example, the user interface 116 may include one or more speakers, displays, or other media output devices. In some embodiments, the user interface 116 may dynamically sense and/or respond to user inputs based, at least in part, on the head pose information generated by the head-pose determination module 114. In some aspects, the user interface 116 may respond to user inputs by dynamically updating the display, for example, to navigate a graphical user interface (GUI), display new content, track cursor movement, and the like. In some other aspects, the user interface 116 may generate a search query in response to certain user inputs.

To prevent accidental GUI updates and/or unintended searches, the user interface 116 may ensure that the user 101 is actively engaged with or paying attention to the sensing device 110 before processing user inputs from the user 101. In some embodiments, the user interface 116 may determine the attentiveness of the user 101 based, at least in part, on the head pose information generated by the head-pose determination module 114. For example, the user interface 116 may determine that the user 101 is likely paying attention to (and thus intending to interact with the sensing device 110) if the user 101 is facing, looking at, or attending to the sensing device 110. Accordingly, the user interface 116 may sense, process, or respond to user inputs only when the user 101 is paying attention to the sensing device 110.

As described above, head pose estimation has many uses and applications in computer vision systems and devices. For example, many Internet of Things (IoT) systems implement low-power sensors and/or devices that are also capable of local data processing (e.g., without having to send the data to a server or cloud computing environment). To satisfy the low power requirement, many IoT devices are configured to operate with limited or minimal computational complexity. Further, many head pose estimation techniques are implemented across a wide range of devices with different cameras configurations (e.g., from different manufacturers). To ensure robust performance across myriad devices, aspects of the present disclosure provide a head pose estimation technique that is camera-agnostic.

Among other advantages, the present embodiments provide a robust approach for head pose estimation without the need for camera calibration. In some embodiments, the head-pose determination module 114 may estimate a user's head pose without estimating a translation and a rotation vector of the face with respect to the camera. More specifically, in some aspects, the head-pose determination module 114 may estimate a user's head pose using only the facial landmark information extracted from an image of the user's face. Accordingly, the present embodiments do not require knowledge of the camera's intrinsic parameters (such as focal length and the principal point), which may vary across sensing devices and/or different instances of the same device. Thus, the present embodiments may be implemented by any camera-based sensing device with no a priori knowledge of the camera's intrinsic parameters.

Figure 2:
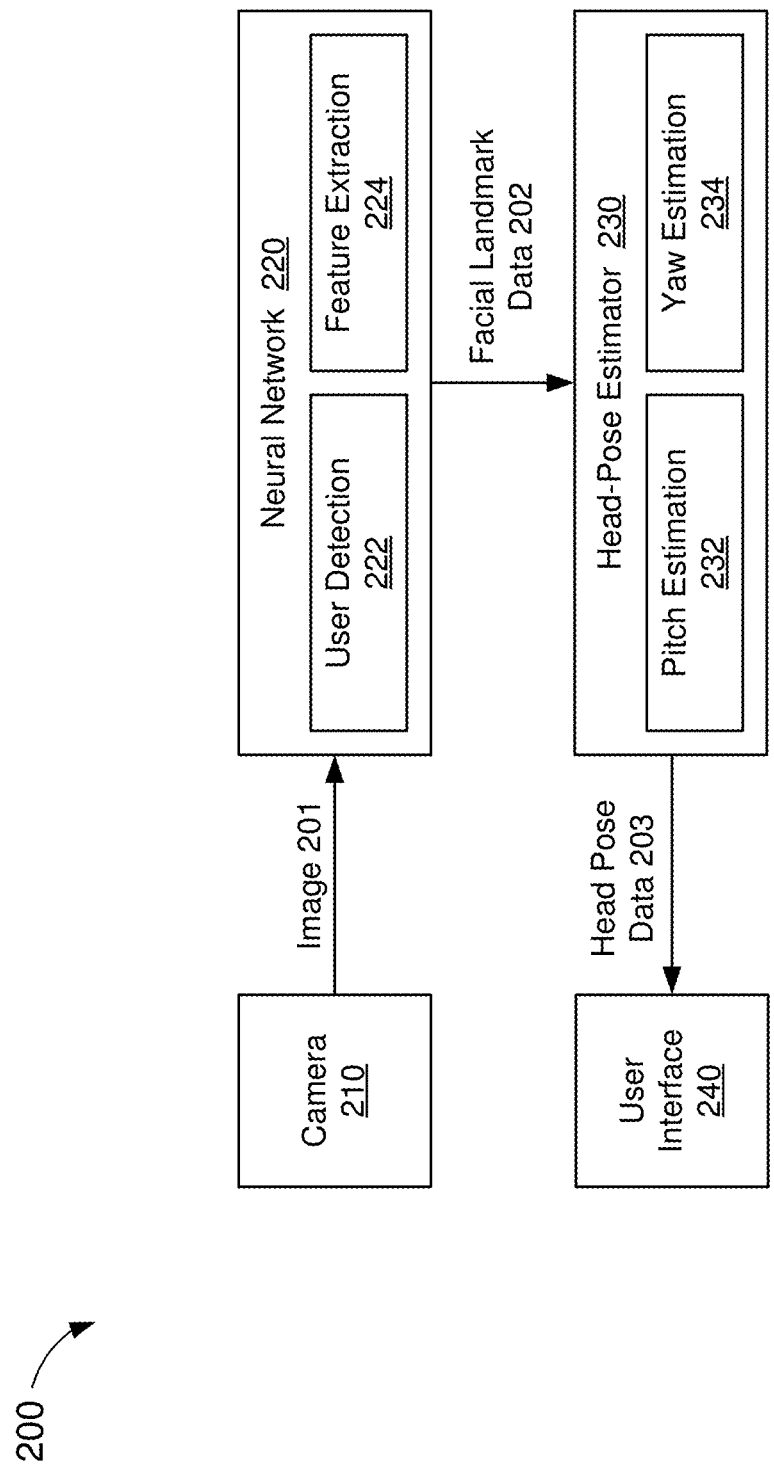
FIG. 2 shows a block diagram of a sensing device, in accordance with some embodiments.

FIG. 2 shows a block diagram of a sensing device 200, in accordance with some embodiments. The sensing device 200 may be one embodiment of the sensing device 110 of FIG. 1. The sensing device 200 includes a camera 210, a neural network 220, a head-pose estimator 230, and a user interface 240. In the embodiment of FIG. 2, the camera 210 is depicted as part of the sensing device 200. In other embodiments, the camera 210 may be separate from (e.g., coupled to) the sensing device 200.

The camera 210 is configured to capture one or more images 201 of the environment surrounding the sensing device 200. The camera 210 may be one embodiment of one or more of the sensors 112 of FIG. 1. Thus, the camera 210 may be configured to capture images (e.g., still-frame images and/or video) of a scene within a FOV of the sensing device 200. For example, the camera 210 may comprise one or more optical sensors (e.g., photodiodes, CMOS image sensor arrays, CCD arrays, and/or any other sensors capable of detecting wavelengths of light in the visible spectrum, the infrared spectrum, and/or the ultraviolet spectrum).

The neural network 220 is configured to extract facial landmark data 202 from the captured images 201. The neural network 220 includes a user detection module 222 and a feature extraction module 224. The user detection module 222 may detect a presence of one or more users in the captured images 201. For example, the user detection module 222 may detect the presence of a user using any known face detection algorithms and/or techniques. In some embodiments, the neural network 220 may implement one or more neural network models to generate inferences about human faces in the captured images 201. In some embodiments, the neural network models may be trained to identify one or more facial features (e.g., eyes, nose, mouth, ears, eyebrows, teeth, lips, chin, cheeks, beard, moustache, etc.) from 2D images of a user's face.

The feature extraction module 224 may determine one or more feature vectors from the identified user's face. Each of the feature vectors may identify a location (e.g., pixel location) of a respective facial feature in the captured image 201. Example feature vectors may include, but are not limited to, a left-eye vector, a right-eye vector, a left-mouth vector, a right-mouth vector, and a nose vector. The left-eye vector describes the location of the user's left eye, the right-eye vector describes the location of the user's right eye, the left-mouth vector describes the location of the left portion of the user's mouth, the right-mouth vector describes the location of the right portion of the user's mouth, and the nose vector describes the location of the user's nose.

The head-pose estimator 230 receives the feature vectors (as facial landmark data 202) from the neural network 220. The head-pose estimator 230 is configured to generate head pose data 203 based on the received feature vectors. In some embodiments, the head-pose estimator 230 may estimate the user's head pose based on relative distances between two or more of the feature vectors. For example, in some aspects, the head-pose estimator 230 may determine the pose or position of the user's head based on distances from the nose vector to one or more of the remaining feature vectors. The head pose estimator 230 may include at least a pitch estimation module 232 and a yaw estimation module 234.

The pitch estimation module 232 determines a pitch of the user's head based on the relative distances between two or more feature vectors. For example, as the pitch of the user's head increases (e.g., tilts towards the sky), the distance from the nose to the mouth may increase relative to the distance from the nose to the eyes. On the other hand, as the pitch of the user's head decreases (e.g., tilts towards the ground), the distance from the nose to the mouth may decrease relative to the distance from the nose to the eyes. Thus, in some embodiments, the pitch estimation module 232 may determine the pitch of the user's head based on the distances from the nose vector to each of a midpoint between the left-eye vector and the right-eye vector and a midpoint between the left-mouth vector and the right-mouth vector.

The yaw estimation module 235 determines a yaw of the user's head based on the relative distances between two or more feature vectors. For example, as the yaw of the user's head increases (e.g., turns towards the right), the distance from the nose to a feature on the left side of the face increases relative to the distance from the nose to a similar feature on the right side of the face. On the other hand, as the yaw of the user's head decreases (e.g., turns towards the left), the distance from the nose to a feature on the left side of the face decreases relative to the distance from the nose to a similar feature on the right side of the face. Thus, in some embodiments, the yaw estimation module 234 may determine the yaw of the user's head based on the distances form the nose vector to each of a midpoint between the left-eye vector and the left-mouth vector and a midpoint between the right-eye vector and the right-mouth vector.

The user interface 240 may control or adjust an operation of the sensing device 200 based, at least in part, on the head pose data 203. The user interface 240 may be one embodiment of the user interface 116 of FIG. 1. Thus, the user interface 240 may provide an interface through which a user can operate, interact with, or otherwise use the sensing device 200 or an electronic system (not shown for simplicity) coupled to the sensing device 200. For example, the user interface 240 may include one or more speakers, displays, or other media output devices. In some embodiments, the user interface 240 may dynamically sense and/or respond to user inputs based, at least in part, on the head pose data 203.

In some implementations, the sensing device 200 may be (part of) a smart speaker. For example, a user may query the smart speaker for information (e.g., recipes, instructions, directions, and the like), to playback media content (e.g., music, videos, audiobooks, and the like), or to control various devices in the user's home or office environment (e.g., lights, thermostats, garage doors, and other home automation devices). Such queries may be triggered by the user's voice, for example, in the form of verbal commands or instructions. To prevent the smart speaker from processing false or accidental voice queries, the smart speaker may be configured to listen and/or respond to the user only when the user is paying attention to the device. In some embodiments, the smart speaker may determine the attentiveness of the user based, at least in part, on the head pose data 203.

In some other implementations, the sensing device 200 may be (part of) a smart doorbell. For example, when a visitor approaches a house equipped with a smart doorbell, the smart doorbell records an image and/or video of the visitor and uploads the media to a network or cloud-based service so that the owner of the smart doorbell may view the recorded images and/or video. Many smart doorbells are configured to record the entire scene within it's FOV, which may include one or more passersby. Due to privacy concerns, the smart doorbell may be configured to record only the visitor(s) of the house while obfuscating any faces in the background. In some embodiments, the smart doorbell may determine the faces to be recorded (e.g., the person facing the doorbell) based, at least in part, on the head pose data 203.

Still further, in some implementations, the sensing device may be (part of) a pair of smart glasses. For example, the smart glasses may provide the user (or wearer) with a heads-up display (HUD) and/or augmented reality (AR) which includes information about the scene the user is viewing, which may include person(s) not facing or interacting with the user. The information is generated by sending images and/or video of the scene to a network or cloud-based service. Due to privacy concerns, the smart glasses may be configured to record only the person(s) facing the user and/or within a threshold distance from the user while obfuscating the faces of any person(s) the user may not be interacting with. Moreover, in devices designed to aid the visually-impaired, the smart glasses may be configured to provide the user with a notification that the person(s) facing the user is directly in front, to the left, or to the right of the user. In some embodiments, the smart glasses may determine the faces to be recorded and/or relative locations of the faces based, at least in part, on the head pose data 203.

Figure 3:
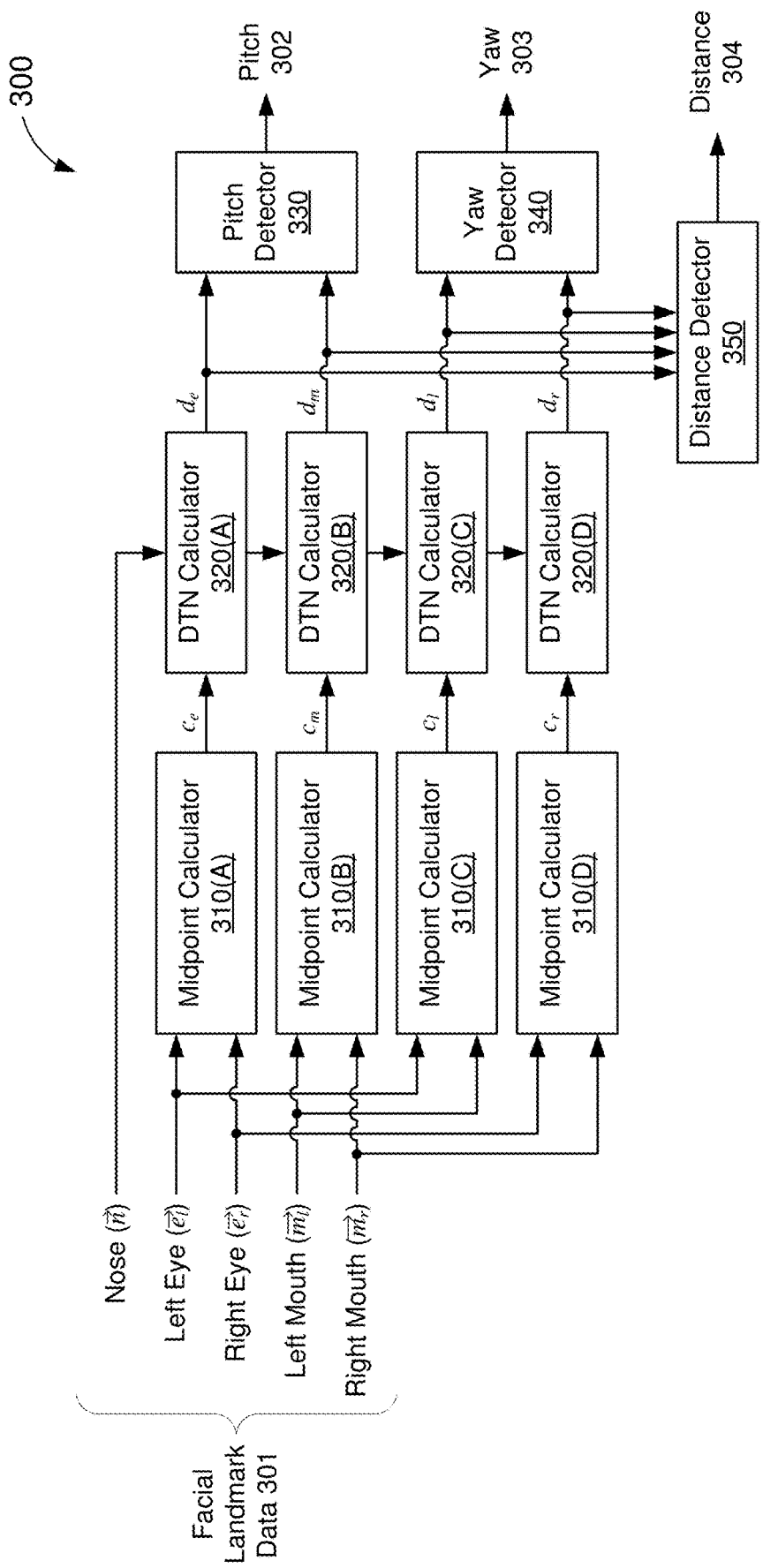
FIG. 3 shows a block diagram of a head-pose estimation circuit, in accordance with some embodiments.

FIG. 3 shows a block diagram of a head-pose estimation circuit 300, in accordance with some embodiments. The head-pose estimation circuit 300 may be one embodiment of the head-pose estimator 230 of FIG. 2. The head-pose estimation circuit 300 includes a number of midpoint calculators 310(A)-310(D) (or multiple instances of a single midpoint calculator), a number of distance-to-nose (DTN) calculators 320(A)-320(D) (or multiple instances of a single DTN calculator), a pitch detector 330, a yaw detector 340, and a distance detector 350.

The head-pose estimation circuit 300 is configured to determine a pitch 302, yaw 303, and/or distance 304 of a user's head relative to a camera based on facial landmark data 301 extracted from an image captured by the camera. The facial landmark data 301 may be inferred from the image using one or more neural network models (e.g., as described with respect to FIG. 2). In the embodiment of FIG. 3, the facial landmark data 301 is shown to include a nose vector ($\vec{n}$) a left-eye vector ($\vec{e}_l$), a right-eye vector ($\vec{e}_r$), a left-mouth vector ($\vec{m}_l$), and a right-mouth vector ($\vec{m}_r$). In other embodiments, the facial landmark data 301 may include fewer or more feature vectors including and/or excluding any of those depicted in FIG. 3.

Each of the feature vectors $\vec{n}$, $\vec{e}_l$, $\vec{e}_r$, $\vec{m}_l$, and $\vec{m}_r$ indicates a respective point (e.g., pixel or subset of pixels) in the underlying image that is associated with the corresponding facial feature. More specifically, each feature vector may point to a particular location in 2D space. For example, the feature vectors may be described or represented by a set of cartesian coordinates (x, y). Thus, the vector $\vec{n}$ may point to a location of the user's nose, the vector $\vec{e}_l$ may point to a location of the user's left eye, the vector $\vec{e}_r$ may point to a location of the user's right eye, the vector $\vec{e}_l$ may point to a location of a left portion (e.g., corner) of the user's mouth, and the vector $\vec{m}_r$ may point to a location of a right portion (e.g., corner) of the user's mouth.

Each of the midpoint calculators 310(A)-310(D) is configured to receive a different pair of feature vectors ($\vec{n}$, $\vec{e}_l$, $\vec{e}_r$, $\vec{m}_l$, and $\vec{m}_r$) and calculate a midpoint between them. For example, the first midpoint calculator 310(A) may calculate a midpoint ($c_e$) between the left-eye vector $\vec{e}_l$ and the right-eye vector $$\vec{e}_r \left(\text{e.g., } c_e = \frac{1}{2}(\vec{e}_l + \vec{e}_r)\right),$$

the second midpoint calculator 310(B) may calculate a midpoint ($c_m$) between the left-mouth vector $\vec{m}_l$ and the right-mouth vector $$\vec{m}_r \left(\text{e.g., } c_m = \frac{1}{2}(\vec{m}_l + \vec{m}_r)\right),$$

the third midpoint calculator 310(C) may calculate a midpoint ($c_l$) between the left-eye vector $\vec{e}_l$ and the left-mouth vector $$\vec{m}_l \left(\text{e.g., } c_l = \frac{1}{2}(\vec{e}_l + \vec{m}_l)\right),$$

and the fourth midpoint calculator 310(D) may calculate a midpoint ($c_r$) between the right-eye vector $\vec{e}_r$ and the right-mouth vector $$\vec{m}_r \left(\text{e.g., } c_r = \frac{1}{2}(\vec{e}_r + \vec{m}_r)\right).$$

Each of the DTN calculators 320(A)-320(D) is configured to receive a respective one of the midpoints ($c_e$, $c_m$, $c_l$, and $c_r$) and calculate a distance from the nose vector $\vec{n}$ to the respective midpoint. For example, the first DTN calculator 320(A) may calculate a distance ($d_e$) from the nose vector $\vec{n}$ to the midpoint $c_e$ between the left and right eyes (e.g., $d_e = \|c_e - \vec{n}\|_2$), the second DTN calculator 320(B) may calculate a distance ($d_m$) from the nose vector $\vec{n}$ to the midpoint $c_m$ between the left and right portions of the mouth (e.g., $d_m = \|c_m - \vec{n}\|_2$), the third DTN calculator 320(C) may calculate a distance ($d_l$) from the nose vector $\vec{n}$ to the midpoint $c_l$ between the left eye and the left portion of the mouth (e.g., $d_l = \|c_l - \vec{n}\|_2$), the fourth DTN calculator 320(D) may calculate a distance ($d_r$) from the nose vector $\vec{n}$ to the midpoint $c_r$ between the right eye and the right portion of the mouth (e.g., $d_r = \|c_r - \vec{n}\|_2$).

Figure 4:
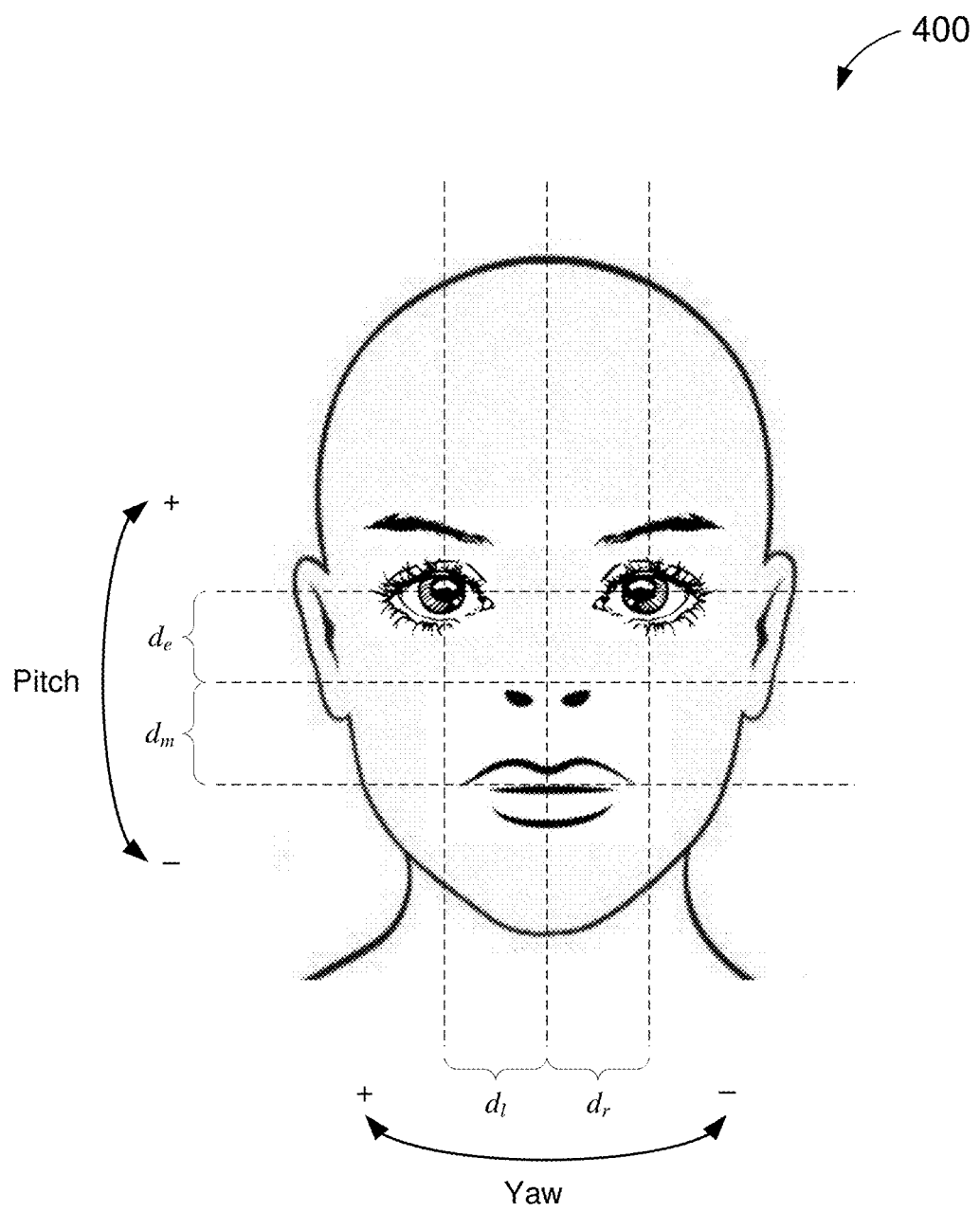
FIG. 4 shows an example image that can be captured by a sensing device, in accordance with some embodiments.

The pitch detector 330 is configured to determine the pitch 302 of the user's head based on the distances $d_e$ and $d_m$. With reference to the example image 400 of FIG. 4, it can be seen that the distances $d_e$ and $d_m$ have a given ratio when the user is directly facing the camera or sensing device. As the user tilts his or her head backward (e.g., pitch increases), the distance from the nose to the mouth ($d_m$) may increase and/or the distance from the nose to the eyes ($d_e$) may decrease. As the user tilts his or her head forward (e.g., pitch decreases), the distance from the nose to the mouth ($d_m$) may decrease and/or the distance from the nose to the eyes ($d_e$) may increase. Accordingly, the pitch 302 can be expressed as a ratio of the distances $d_e$ and $d_m$:

$$\text{pitch} \propto \frac{d_m}{d_m + d_e} - \frac{1}{2}$$

The yaw detector 340 is configured to determine the yaw 303 of the user's head based on the distances $d_l$ and $d_r$. With reference to the example image 400 of FIG. 4, it can be seen that the distances $d_l$ and $d_r$ have a given ratio when the user is directly facing the camera or sensing device. As the user turns his or her head to the right (e.g., yaw increases), the distance from the nose to the left side of the face ($d_l$) may increase and/or the distance from the nose to the right side of the face ($d_r$) may decrease. As the user turns his or her head to the left (e.g., yaw decreases), the distance from the nose to the left side of the face ($d_l$) may decrease and/or the distance from the nose to the right side of the face ($d_r$) may increase. Accordingly, the yaw 303 can be expressed as a ratio of the distances $d_l$ and $d_r$:

$$\text{yaw} \propto \frac{d_l}{d_l + d_r} - \frac{1}{2}$$

The distance detector 350 is configured to determine the distance 304 of the user's head based on the distances $d_e$, $d_m$, $d_l$, and $d_r$. With reference to the example image 400 of FIG. 4, it can be seen that the combined distances $d_e + d_m$ and/or $d_l + d_r$ are approximately proportional to the distance between the user and the camera. As the user moves further from the camera (e.g., distance increases), the distance from the eyes to the mouth ($d_e + d_m$) may decrease and/or the distance from the left side of the user's face to the right side of the user's face ($d_l + d_r$) may decrease. As the user moves closer to the camera (e.g., distance decreases), the distance between the eyes and the mouth ($d_e + d_m$) may increase and/or the distance between the left and right sides of the user's face ($d_l + d_r$) may increase. However, the pitch of the user's head may affect the overall distance between the eyes and the mouth ($d_e + d_m$) and the yaw of the user's head may affect the overall distance between the left and right sides of the user's face ($d_l + d_r$). Accordingly, the distance 304 can be expressed as proportional to a maximum of the combined distances $d_e + d_m$ or $d_l + d_r$:

$$\text{distance} \propto \max(d_e + d_m, d_l + d_r)$$

The estimated distance 304 represents a relative distance (e.g., proportionality) between the user's head and the camera. For example, the distance value is generally larger when the user is closer to the camera and is generally smaller when the user is further away from the camera. To determine an absolute distance between the user's head and the camera, the estimated distance 304 may be multiplied by a scalar quantity associated with a known distance to the camera. In some aspects, the scalar quantity may be predetermined by a manufacturer of the camera and/or sensing device. In some other aspects, the scalar quantity may be estimated by a user of the sensing device. Still further, in some aspects, the scalar quantity may be calibrated during an operation of the sensing device.

For example, the camera may capture an image of the user's head while the user is holding and/or operating (e.g., touching) the sensing device. Aspects of the present disclosure recognize that the user's head will be within a threshold distance (e.g., no more than an arm's length) of the camera when the user is in contact with the sensing device. Thus, in some embodiments, the sensing device may calibrate the scalar quantity using images acquired while the user is operating the sensing device. The scalar quantity may be calculated using any known distance estimation techniques including, but not limited to, estimations based on ear-to-ear measurements, chin-to-hair measurements, and/or the total area of the user's face or head. The scalar quantity may be further updated (e.g., based on a running average) each time the camera captures a new image of the user's head during a subsequent operation of the sensing device. In some embodiments, the scalar quantity may be further used to determine the absolute distance of other objects and/or features in the captured image (e.g., not just the user's head).

The head-pose estimation circuit 300 may be configured to generate fewer or more head pose data than what is shown in FIG. 3 (e.g., pitch 302, yaw 303, and distance 304). For example, in some embodiments, the head-pose estimation circuit 300 may further determine a location of the face relative to the camera or sensing device. The location information may be determined based on the location of one or more of the feature vectors ($\vec{n}$, $\vec{e}_l$, $\vec{e}_r$, $\vec{m}_l$, and $\vec{m}_r$) with respect to the dimensions of the image 400. If the feature vectors are positioned closer toward the left edge than the right edge of the image 400, the user may be located to the right of the camera. If the feature vectors are positioned closer toward the right edge than the left edge of the image 400, the user may be located to the left of the camera. Other head pose data may also be determined using the feature vectors ($\vec{n}$, $\vec{e}_l$, $\vec{e}_r$, $\vec{m}_l$, and $\vec{m}_r$) without deviating from the scope of this disclosure.

Figure 5:
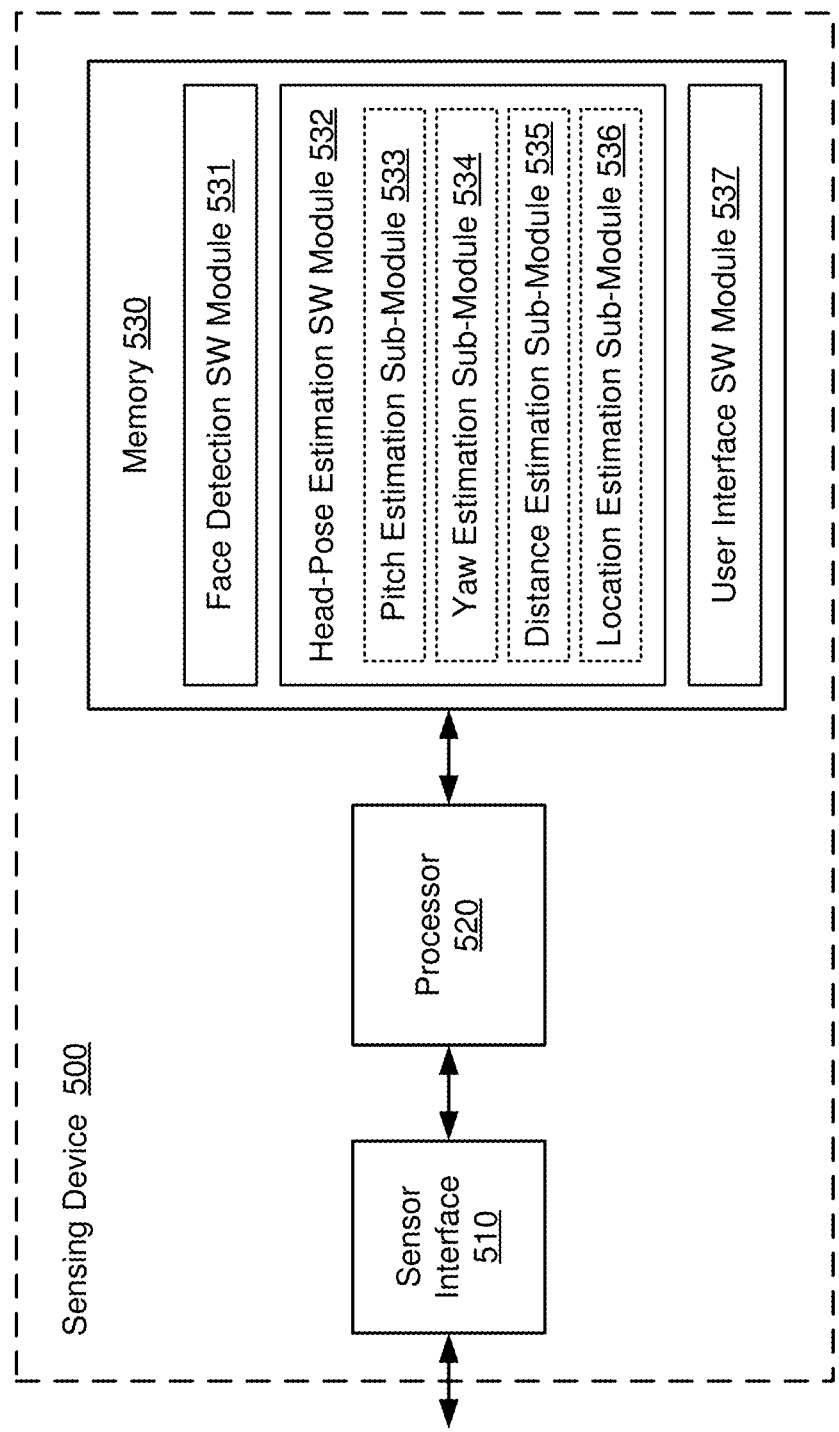
FIG. 5 shows another block diagram of a sensing device, in accordance with some embodiments.

FIG. 5 shows another block diagram of a sensing device 500, in accordance with some embodiments. The sensing device 500 may be one embodiment of the sensing device 200 of FIG. 2 and/or sensing device 110 of FIG. 1. The sensing device 500 includes a sensor interface 510, a processor 520, and a memory 530.

The sensor interface 510 may be used to communicate with one or more sensors coupled to the sensing device 500. Example sensors may include, but are not limited to, cameras, capacitive sensors, microphones, and the like. In some implementations, the sensor interface 510 may be configured to communicate with a camera of the sensing device 500 (e.g., camera 210 of FIG. 2). For example, the sensor interface 510 may transmit signals to, and receive signals from, the camera to capture an image of a scene facing the sensing device 500.

The memory 530 may also include a non-transitory computer-readable medium (e.g., one or more nonvolatile memory elements, such as EPROM, EEPROM, Flash memory, a hard drive, etc.) that may store at least the following software (SW) modules:
- a face detection SW module 531 to detect a user in one or more images captured by the camera and extract facial landmark data from the image of the user.
- a head-pose estimation SW module 532 to estimate a pose or position of the user's head relative to the camera based on the facial landmark data, the head-pose estimation SW module 532 further including:
  - a pitch estimation sub-module 533 to determine a pitch of the user's head based on the facial landmark data;
  - a yaw estimation sub-module 534 to determine a yaw of the user's head based on the facial landmark data;
  - a distance estimation sub-module 535 to determine a distance of the user's head based on the facial landmark data; and
  - a location estimation sub-module 536 to determine a location of the user's head based on the facial landmark data; and
- a user interface SW module 537 to dynamically control or adjust an operation of the sensing device 500, or an electronic system coupled to the sensing device 500, based at least in part on the head pose data.

Each software module includes instructions that, when executed by the processor 520, cause the sensing device 500 to perform the corresponding functions. The non-transitory computer-readable medium of memory 530 thus includes instructions for performing all or a portion of the operations described below with respect to FIGS. 6-9.

Processor 520 may be any suitable one or more processors capable of executing scripts or instructions of one or more software programs stored in the sensing device 500. For example, the processor 520 may execute the face detection SW module 531 to detect a user in one or more images captured by the camera and extract facial landmark data from the image of the user. The processor 520 may also execute the head-pose estimation SW module 532 to estimate a pose or position of the user's head relative to the camera based on the facial landmark data. Still further, the processor 520 may execute the user interface SW module 537 to dynamically control or adjust an operation of the sensing device 500, or an electronic system coupled to the sensing device 500, based at least in part on the head pose data.

In executing the head-pose estimation SW module 532, the processor 520 may further execute the pitch estimation sub-module 533, the yaw estimation sub-module 534, the distance estimation sub-module 535, and/or the location estimation sub-module 536. The processor 520 may execute the pitch estimation sub-module 533 to determine a pitch of the user's head based on the facial landmark data. The processor 520 may also execute the yaw estimation sub-module 534 to determine a yaw of the user's head based on the facial landmark data. Further, the processor 520 may execute the distance estimation sub-module 535 to determine a distance of the user's head based on the facial landmark data. Still further, the processor 520 may execute the location estimation sub-module 536 to determine the location of the user's head based on the facial landmark data.

Figure 6:
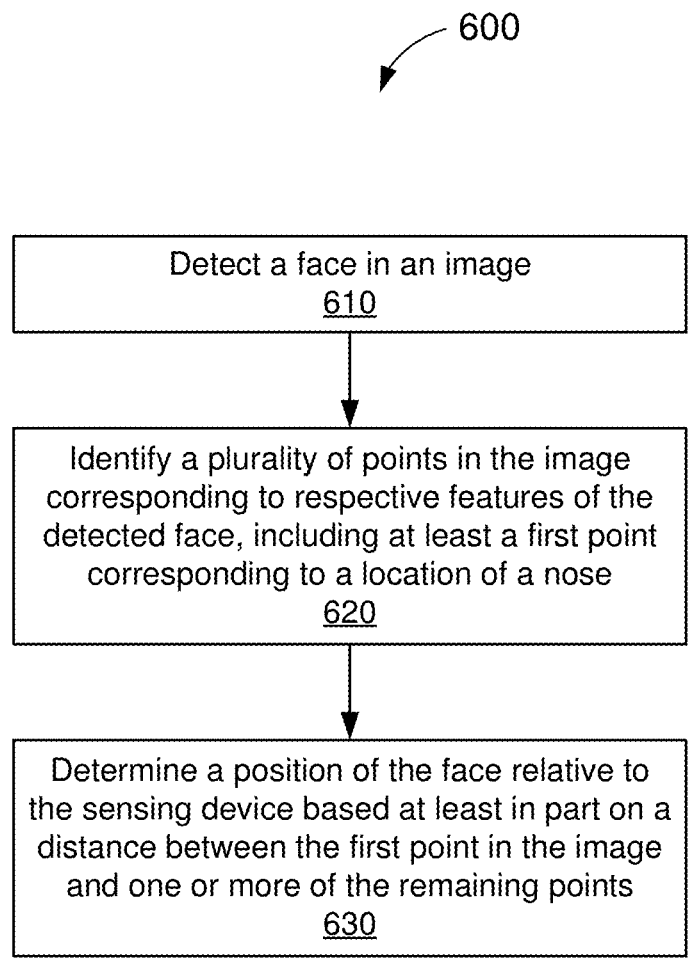
FIG. 6 is an illustrative flowchart depicting an example operation for determining a head pose of a user by a sensing device, in accordance with some embodiments.

FIG. 6 is an illustrative flowchart depicting an example operation 600 for determining a head pose of a user by a sensing device, in accordance with some embodiments. With reference for example to FIG. 1, the operation 600 may be performed by the sensing device 110 to determine a pose or position of a user's head relative to the sensing device 110.

The sensing device may further detect a face in the captured image (610). The image may include still-frame images and/or videos captured by a camera in, or coupled to, the sensing device. For example, the sensing device may detect the presence of one or more users using any known face detection algorithms and/or techniques. In some embodiments, the neural network 220 may implement one or more neural network models to generate inferences about human faces in the captured images 201. In some embodiments, the neural network models may be trained to identify one or more facial features (e.g., eyes, nose, mouth, etc.) from 2D images of a user's face.

The sensing device also identifies a plurality of points in the image corresponding to respective features of the detected face (620). In some embodiments, the plurality of points may include at least a first point corresponding to a location of the user's nose. For example, the sensing device may determine one or more feature vectors from the identified user's face. Each of the feature vectors may identify a location (e.g., pixel location) of a respective facial feature in the captured image 201. Example feature vectors may include, but are not limited to, a left-eye vector, a right-eye vector, a left-mouth vector, a right-mouth vector, and a nose vector.

The sensing device may then determine a position of the face relative to the sensing device based, at least in part, on a distance between the first point in the image and one or more of the remaining points (630). In some embodiments, the sensing device may determine the pitch of the user's head based on the distances from the nose vector to each of a midpoint between the left-eye vector and the right-eye vector and a midpoint between the left-mouth vector and the right-mouth vector. In some other embodiments, the sensing device may determine the yaw of the user's head based on the distances from the nose vector to each of a midpoint between the left-eye vector and the left-mouth vector and a midpoint between the right-eye vector and the right-mouth vector.

Figure 7:
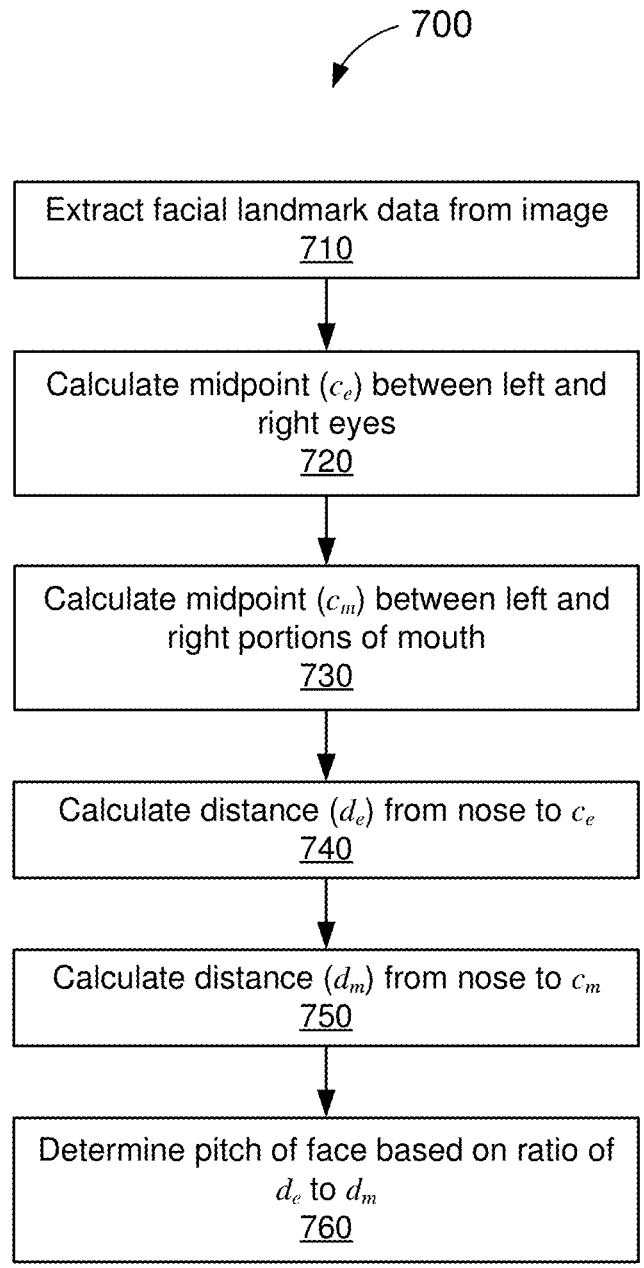
FIG. 7 is an illustrative flowchart depicting an example operation for determining the pitch of a face in a captured image, in accordance with some embodiments.

FIG. 7 is an illustrative flowchart depicting an example operation 700 for determining the pitch of a face in a captured image, in accordance with some embodiments. With reference for example to FIG. 3, the operation 700 may be performed by the head-pose estimation circuit 300.

The head-pose estimation circuit may first receive facial landmark data (710). In some embodiments, the facial landmark data may include at least a nose vector ($\vec{n}$), a left-eye vector ($\vec{e_l}$), a right-eye vector ($\vec{e_r}$), a left-mouth vector ($\vec{m_l}$), and a right-mouth vector ($\vec{m_r}$). Each of the feature vectors $\vec{n}$, $\vec{e_l}$, $\vec{e_r}$, $\vec{m_l}$, and $\vec{m_r}$, indicates a respective point in the underlying image that is associated with the corresponding facial feature.

The head-pose estimation circuit may calculate a first midpoint ($c_e$) between the left and right eyes in the image (720). For example, as shown in FIG. 3, the first midpoint calculator 310(A) may calculate the midpoint $c_e$ between the left-eye vector $\vec{e_l}$ and the right-eye vector $$\vec{e_r} \left( \text{e.g., } c_e = \frac{1}{2}(\vec{e_l} + \vec{e_r}) \right).$$

The head-pose estimation circuit may calculate a second midpoint ($c_m$) between the left and right portions of the mouth in the image (730). For example, as shown in FIG. 3, the second midpoint calculator 310(B) may calculate the midpoint $c_m$ between the left-mouth vector $\vec{m_l}$ and the right-mouth vector $$\vec{m_r} \left( \text{e.g., } c_m = \frac{1}{2}(\vec{m_l} + \vec{m_r}) \right).$$

The head-pose estimation circuit may further calculate a distance ($d_e$) from the nose in the image to the first midpoint $c_e$ (740). For example, as shown in FIG. 3, the first DTN calculator 320(A) may calculate the distance $d_e$ from the nose vector $\vec{n}$ to the midpoint $c_e$ between the left and right eyes (e.g., $d_e = \|c_e - \vec{n}\|_2$).

The head-pose estimation circuit may also calculate a distance ($d_m$) from the nose in the image to the second midpoint $c_m$ (750). For example, as shown in FIG. 3, the second DTN calculator 320(B) may calculate the distance $d_m$ from the nose vector $\vec{n}$ to the midpoint $c_m$ between the left and right portions of the mouth (e.g., $d_m = \|c_m - \vec{n}\|_2$).

The head-pose estimation circuit may then determine the pitch of the face based on a ratio of the distances $d_e$ and $d_m$ (760). For example, as shown in FIG. 3, the pitch detector 330 may determine the pitch of the user's head or face by comparing the distance from the nose to the mouth $d_m$ with the distance from the nose to the eyes $d_e$:

$$\text{pitch} \propto \frac{d_m}{d_m + d_e} - \frac{1}{2}$$

Figure 8:
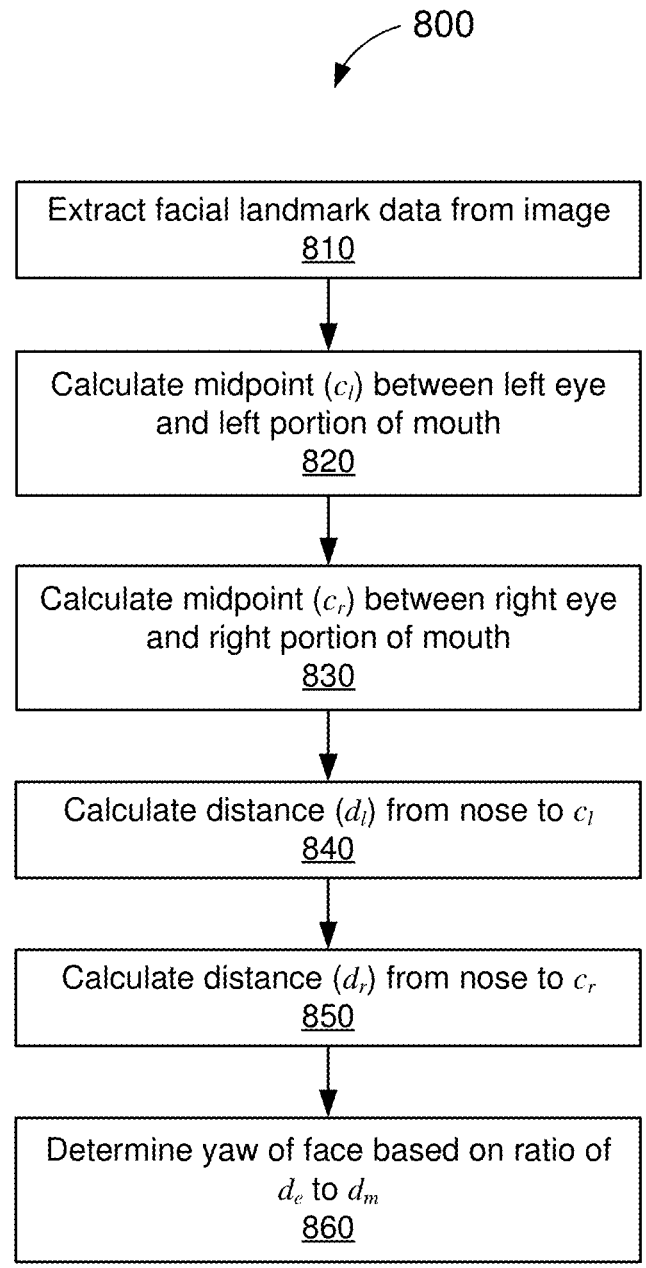
FIG. 8 is an illustrative flowchart depicting an example operation for determining the yaw of a face in a captured image, in accordance with some embodiments.

FIG. 8 is an illustrative flowchart depicting an example operation 800 for determining the yaw of a face in a captured image, in accordance with some embodiments. With reference for example to FIG. 3, the operation 800 may be performed by the head-pose estimation circuit 300.

The head-pose estimation circuit may first receive facial landmark data (810). In some embodiments, the facial landmark data may include at least a nose vector ($\vec{n}$), a left-eye vector ($\vec{e_l}$), a right-eye vector ($\vec{e_r}$), a left-mouth vector ($\vec{m_l}$), and a right-mouth vector ($\vec{m_r}$). Each of the feature vectors $\vec{n}$, $\vec{e_l}$, $\vec{e_r}$, $\vec{m_l}$, and $\vec{m_r}$ indicates a respective point in the underlying image that is associated with the corresponding facial feature.

The head-pose estimation circuit may calculate a first midpoint ($c_l$) between the left eye in the image and the left portion of the mouth (820). For example, as shown in FIG. 3, the third midpoint calculator 310(C) may calculate the midpoint $c_l$ between the left-eye vector $\vec{e_l}$ and the left-mouth vector $$\vec{m_l} \left( \text{e.g., } c_l = \frac{1}{2}(\vec{e_l} + \vec{m_l}) \right).$$

The head-pose estimation circuit may calculate a second midpoint ($c_r$) between the right eye in the image and the right portion of the mouth (830). For example, as shown in FIG. 3, the fourth midpoint calculator 310(D) may calculate the midpoint $c_r$ between the right-eye vector $\vec{e_r}$ and the right-mouth vector $$\vec{m_r} \left( \text{e.g., } c_r = \frac{1}{2}(\vec{e_r} + \vec{m_r}) \right).$$

The head-pose estimation circuit may further calculate a distance ($d_l$) from the nose in the image to the first midpoint $c_l$ (840). For example, as shown in FIG. 3, the third DTN calculator 320(C) may calculate the distance $d_l$ from the nose vector $\vec{n}$ to the midpoint $c_l$ between the left eye and the left portion of the mouth (e.g., $d_l = \|c_l - \vec{n}\|_2$).

The head-pose estimation circuit may also calculate a distance ($d_r$) from the nose in the image to the second midpoint $c_r$ (850). For example, as shown in FIG. 3, the fourth DTN calculator 320(D) may calculate the distance $d_r$ from the nose vector $\vec{n}$ to the midpoint $c_r$ between the right eye and the right portion of the mouth (e.g., $d_r = \|c_r - \vec{n}\|_2$).

The head-pose estimation circuit may then determine the yaw of the face based on a ratio of the distances $d_l$ and $d_r$ (860). For example, as shown in FIG. 3, the yaw detector 340 may determine the pitch of the user's head or face by comparing the distance from the nose to the left side of the face $d_l$ with the distance from the nose to the right side of the face $d_r$:

$$\text{yaw} \propto \frac{d_l}{d_l + d_r} - \frac{1}{2}$$

Figure 9:
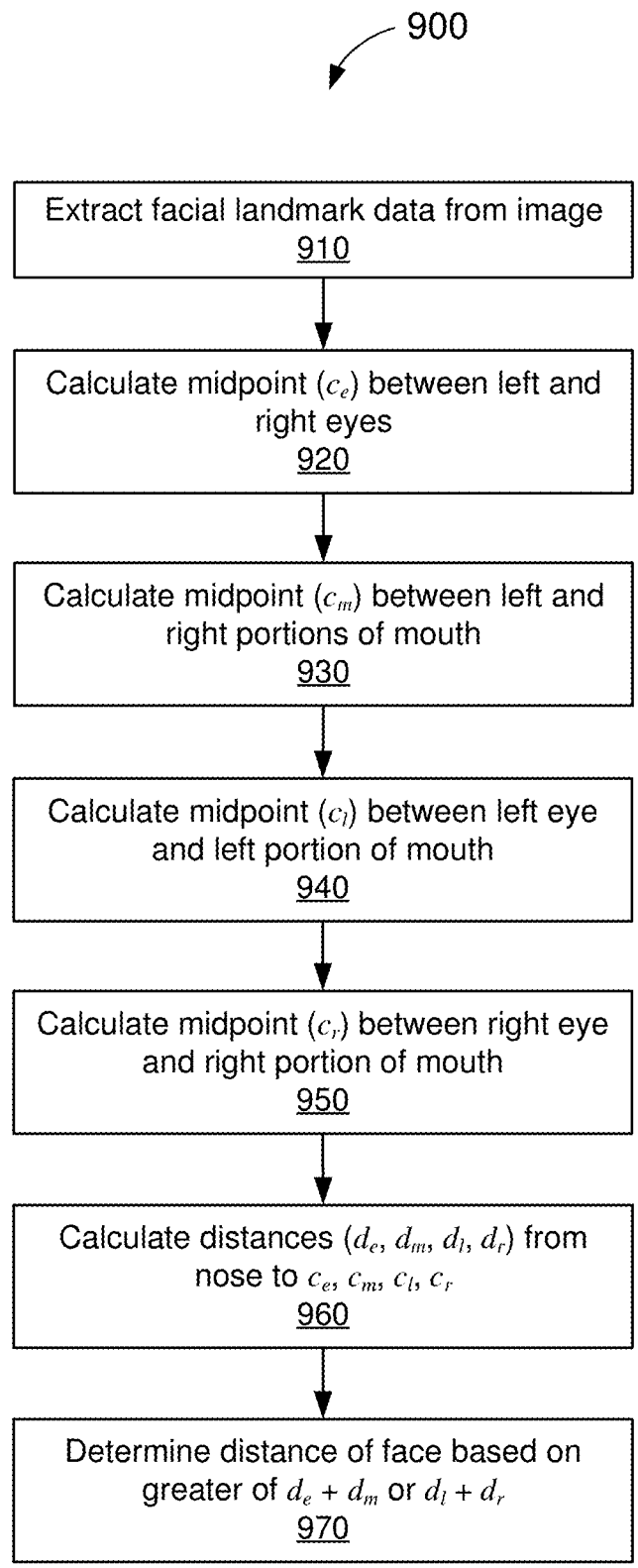
FIG. 9 is an illustrative flowchart depicting an example operation for determining the distance of a face in a captured image, in accordance with some embodiments.

FIG. 9 is an illustrative flowchart depicting an example operation 900 for determining the distance of a face in a captured image, in accordance with some embodiments. With reference for example to FIG. 3, the operation 900 may be performed by the head-pose estimation circuit 300.

The head-pose estimation circuit may first receive facial landmark data (910). In some embodiments, the facial landmark data may include at least a nose vector ($\vec{n}$), a left-eye vector ($\vec{e_l}$), a right-eye vector ($\vec{e_r}$), a left-mouth vector ($\vec{m_l}$), and a right-mouth vector ($\vec{m_r}$). Each of the feature vectors $\vec{n}$, $\vec{e_l}$, $\vec{e_r}$, $\vec{m_l}$, and $\vec{m_r}$ indicates a respective point in the underlying image that is associated with the corresponding facial feature.

The head-pose estimation circuit may calculate a first midpoint ($c_e$) between the left and right eyes in the image (920). For example, as shown in FIG. 3, the first midpoint calculator 310(A) may calculate the midpoint $c_e$ between the left-eye vector $\vec{e_l}$ and the right-eye vector $$\vec{e_r} \left( \text{e.g., } c_e = \frac{1}{2}(\vec{e_l} + \vec{e_r}) \right).$$

The head-pose estimation circuit may calculate a second midpoint ($c_m$) between the left and right portions of the mouth in the image (930). For example, as shown in FIG. 3, the second midpoint calculator 310(B) may calculate the midpoint $c_m$ between the left-mouth vector $\vec{m_l}$ and the right-mouth vector $$\vec{m_r} \left( \text{e.g.,} \ c_m = \frac{1}{2}(\vec{m_l} + \vec{m_r}) \right).$$

The head-pose estimation circuit may calculate a third midpoint ($c_l$) between the left eye in the image and the left portion of the mouth (940). For example, as shown in FIG. 3, the third midpoint calculator 310(C) may calculate the midpoint $c_l$ between the left-eye vector $\vec{e_l}$ and the left-mouth vector $$\vec{m_l} \left( \text{e.g.,} \ c_l = \frac{1}{2}(\vec{e_l} + \vec{m_l}) \right).$$

The head-pose estimation circuit may calculate a fourth midpoint ($c_r$) between the right eye in the image and the right portion of the mouth (950). For example, as shown in FIG. 3, the fourth midpoint calculator 310(D) may calculate the midpoint $c_r$ between the right-eye vector $\vec{e_r}$ and the right-mouth vector $$\vec{m_r} \left( \text{e.g.,} \ c_r = \frac{1}{2}(\vec{e_r} + \vec{m_r}) \right).$$

The head-pose estimation circuit may further calculate respective distances ($d_e$, $d_m$, $d_l$, and $d_r$) from the nose in the image to each of the midpoints $c_e$, $c_m$, $c_l$, and $c_r$ (960). For example, as shown in FIG. 3, each of the DTN calculators 320(A)-320(D) may receive the nose vector 71 and a respective one of the midpoints $c_e$, $c_m$, $c_l$, and $c_r$, and may further calculate a respective one of the distances $d_e$, $d_m$, $d_l$, and $d_r$ (e.g., $d_e = \|c_e - \vec{n}\|_2$, $d_m = \|c_m - \vec{n}\|_2$, $d_l = \|c_l - \vec{n}\|_2$, $d_r = \|c_r - \vec{n}\|_2$).

The head-pose estimation circuit may then determine the distance of the face based on the greater of the combined distances $d_e + d_m$ or $d_l + d_r$ (970). For example, as shown in FIG. 3, the distance detector 350 may determine the distance of the user's head or face by comparing the distance between the eyes and the mouth ($d_e + d_m$) with the distance between the left and right sides of the user's face ($d_l + d_r$):

distance $\propto \max(d_e + d_m, d_l + d_r)$

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of determining a head pose of a user by a sensing device, comprising:
    detecting a face of the user in a first image;
    identifying a plurality of points in the first image corresponding to respective features of the detected face, the plurality of points including at least a first point corresponding to a location of a first facial feature, a second point corresponding to a location of a second facial feature, a third point corresponding to a location of a third facial feature, a fourth point corresponding to a location of a fourth facial feature, and a fifth point corresponding to a location of a fifth facial feature;
    calculating a first midpoint in the first image between the location of the second facial feature and the location of the third facial feature;
    calculating a second midpoint in the first image between the location of the fourth facial feature and the location of the fifth facial feature;
    calculating a third midpoint in the first image between the location of the second facial feature and the location of the fourth facial feature;
    calculating a fourth midpoint in the first image between the location of the third facial feature and the location of the fifth facial feature;
    calculating a first combined distance from the first point to each of the first midpoint and the second midpoint;
    calculating a second combined distance from the first point to each of the third midpoint and the fourth midpoint; and
    determining a position of the face relative to the sensing device based at least in part on one or more second images of the user, the greater of the first combined distance or the second combined distance, and a ratio of the distances between the first point and each of the first and second midpoints or a ratio of the distances between the first point and each of the third and fourth midpoints.

2. The method of claim 1, wherein the first facial feature is a nose and the remaining points correspond to locations of a mouth or eyes.

3. The method of claim 2, further comprising:
determining a yaw of the face relative to the sensing device based on the ratio of the distances between the first point and each of the first and second midpoints or the ratio of the distances between the first point and each of the third and fourth midpoints.

4. The method of claim 3, wherein
the second facial feature is a left eye, the fourth facial feature is a left portion of a mouth,
the third facial feature is a right eye, and the fifth facial feature is a right portion of the mouth.

5. The method of claim 1, further comprising:
determining a pitch of the face relative to the sensing device based on the ratio of the distances between the first point and each of the first and second midpoints or the ratio of the distances between the first point and each of the third and fourth midpoint.

6. The method of claim 5, wherein
second facial feature is a left eye, the third facial feature is a right eye,
the fourth facial feature is a left portion of a mouth, and the fifth facial feature is a right portion of the mouth.

7. The method of claim 1, wherein
the second facial feature is a left eye, the third facial feature is a right eye,
the fourth facial feature is a left portion of a mouth, and the fifth facial feature is a right portion of the mouth.

8. The method of claim 1, wherein the determining of the position of the face comprises:
determining that the user is in contact with the sensing device; and
determining a scalar quantity based on the one or more second images of the user, the position of the face being determined based at least in part on the scalar quantity.

9. A sensing device, comprising:
processing circuitry; and
memory storing instructions that, when executed by the processing circuitry, causes the sensing device to:
detect a face in a first image;
identify a plurality of points in the first image corresponding to respective features of the detected face, the plurality of points including at least a first point corresponding to a location of a first facial feature, a second point corresponding to a location of a second facial feature, a third point corresponding to a location of a third facial feature, a fourth point corresponding to a location of a fourth facial feature, and a fifth point corresponding to a location of a fifth facial feature;
calculate a first midpoint in the first image between the location of the second facial feature and the location of the third facial feature;
calculate a second midpoint in the first image between the location of the fourth facial feature and the location of the fifth facial feature;
calculate a third midpoint in the first image between the location of the second facial feature and the location of the fourth facial feature;
calculate a fourth midpoint in the first image between the location of the third facial feature and the location of the fifth facial feature;

calculate a first combined distance from the first point to each of the first midpoint and the second midpoint;
calculate a second combined distance from the first point to each of the third midpoint and the fourth midpoint; and
determine a position of the face relative to the sensing device based at least in part on one or more second images of the user, the greater of the first combined distance or the second combined distance, and a ratio of the distances between the first point and each of the first and second midpoints or a ratio of the distances between the first point and each of the third and fourth midpoints.

10. The sensing device of claim 9, wherein the first facial feature is a nose and the remaining points correspond to locations of a mouth or eyes.

11. The sensing device of claim 10, wherein
the second facial feature is a left eye, the third facial feature is a right eye,
the fourth facial feature is a left portion of a mouth, and the fifth facial feature is a right portion of the mouth.

12. The sensing device of claim 9, wherein
the second facial feature is a left eye, the fourth facial feature is a left portion of a mouth,
the third facial feature is a right eye, and the fifth facial feature is a right portion of the mouth.

13. The sensing device of claim 9, wherein execution of the instructions for determining the position of the face causes the sensing device to:
determine that the user is in contact with the sensing device; and
determine a scalar quantity based on the one or more second images of the user, the position of the face being determined based at least in part on the scalar quantity.

14. A system, comprising,
a camera configured to capture a first image of a scene; and
a sensing device configured to:
detect a face in the first image;
identify a plurality of points in the first image corresponding to respective features of the detected face, the plurality of points including at least a first point corresponding to a location of a first facial feature, a second point corresponding to a location of a second facial feature, a third point corresponding to a location of a third facial feature, a fourth point corresponding to a location of a fourth facial feature, and a fifth point corresponding to a location of a fifth facial feature;
calculating a first midpoint in the first image between the location of the second facial feature and the location of the third facial feature;
calculating a second midpoint in the first image between the location of the fourth facial feature and the location of the fifth facial feature;
calculating a third midpoint in the first image between the location of the second facial feature and the location of the fourth facial feature;
calculating a fourth midpoint in the first image between the location of the third facial feature and the location of the fifth facial feature;
calculating a first combined distance from the first point to each of the first midpoint and the second midpoint;
calculating a second combined distance from the first point to each of the third midpoint and the fourth midpoint; and
determine a position of the face relative to the camera based at least in part on the one or more second images, the greater of the first combined distance or the second combined distance, and a ratio of the distances between the first point and each of the first and second midpoints or a ratio of the distances between the first point and each of the third and fourth midpoints.

15. The system of claim 14, wherein
the second facial feature is a left eye, the third facial feature is a right eye,
the fourth facial feature is a left portion of a mouth, and the fifth facial feature is a right portion of the mouth, and the sensing device is to determine the position of the face by:
determining a pitch of the face relative to the camera based on the ratio of the distances from the first point to each of the first and second midpoints.

16. The system of claim 14, wherein
the second facial feature is a left eye, and the fourth facial feature is a left portion of a mouth,
the third facial feature is a right eye, and the fifth facial feature is a right portion of the mouth, and the sensing device is to determine the position of the face by:
determining a yaw of the face relative to the camera based on the ratio of the distances from the first point to each of the third and fourth midpoints.

* * * * *